Figure 1:
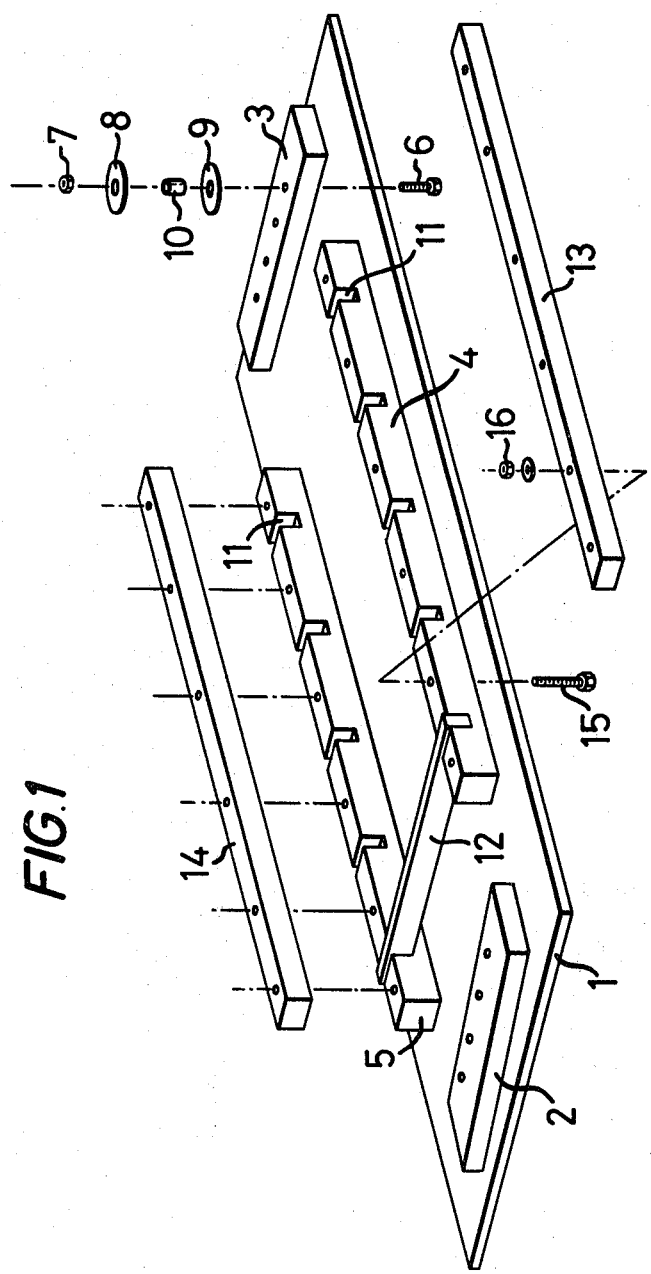

United States Patent [19]

Math

[11] 4,376,669
[45] Mar. 15, 1983

[54] METHOD OF FABRICATING ENERGY ABSORBING STRUCTURE

[75] Inventor: Friedrich C. Math, Farnham, England

[73] Assignee: The British Petroleum Company Limited, London, England

[21] Appl. No.: 292,210

[22] Filed: Aug. 12, 1981

[30] Foreign Application Priority Data

Aug. 15, 1980 [GB] United Kingdom ................. 8026639

[51] Int. Cl.³ .......................... B65H 81/00; B32B 1/00
[52] U.S. Cl. ..................................... 156/161; 52/660; 52/692; 156/162; 156/166; 156/169; 156/210; 428/114; 428/186; 428/188
[58] Field of Search ............... 156/161, 162, 166, 169, 156/180, 210, 433, 434, 173, 172, 175, 425, 443, 484, 486; 428/113, 114, 110, 182, 184, 186, 188, 178; 52/690, 692, 660, 66 X, DIG. 8

[56] References Cited

U.S. PATENT DOCUMENTS

| | | | |
|---|---|---|---|
| 1,993,172 | 3/1935 | Kent | 156/210 |
| 2,606,133 | 8/1952 | Havens | 428/186 |
| 3,425,884 | 2/1969 | Brinkema | 156/161 |
| 3,461,013 | 8/1969 | Gewiss | 156/210 |
| 3,615,983 | 10/1971 | Palfreyman | 156/169 |
| 3,645,833 | 2/1972 | Fisse | 156/169 |
| 3,755,054 | 8/1973 | Medney | 428/113 |
| 3,772,126 | 11/1973 | Myers | 156/44 X |

FOREIGN PATENT DOCUMENTS

2004835 4/1979 United Kingdom .

*Primary Examiner*—Michael W. Ball
*Attorney, Agent, or Firm*—Morgan, Finnegan, Pine, Foley & Lee

[57] ABSTRACT

A method of fabricating an energy absorbing structure for a vehicle comprises the steps of (a) winding a continuous resin wetted filament around a number of attachment points at the opposite ends of a jig to form an array of parallel strands, (b) displacing and tensioning the strands by means of first cross bars substantially at right angles to the strands, (c) winding a second array of parallel strands between the attachment points over said first cross bars, (d) displacing said second array onto said first array by means of second cross bars lying parallel and in between the first cross bars, (e) laying a third array of strands over said first and second cross bars and between said attachment points, and (f) curing the structure. The structure may then be fixed to the interior of a vehicle door panel.

10 Claims, 5 Drawing Figures

METHOD OF FABRICATING ENERGY ABSORBING STRUCTURE

The present invention relates to energy absorbing structures and more particularly to such structures when used in vehicles.

Recent legislation in certain countries requires automobile manufacturers to ensure that the doors of the vehicles are reinforced to give more protection to passengers in the event of side impact from, for example, another vehicle. This legislation applies also to importers of automobiles to these countries.

Current practice is to use energy absorbing panels made from pressed steel which are welded into the inside of the door panels. These steel panels add considerably to the weight of the car which is a notable disadvantage at a time when the manufacturers are attempting to reduce the weight of automobiles in the interests of fuel economy.

The present invention is directed towards an energy absorbing structure which is lighter than conventional structures and yet has similar or better energy absorption properties.

Thus according to the present invention there is provided a method of fabricating an energy absorbing structure comprising the steps of (a) winding a continuous resin wetted filament around a number of attachment points at the opposite ends of a jig to form an array of parallel strands, (b) displacing and tensioning the strands by means of first cross bars substantially at right angles to the strands, (c) winding a second array of parallel strands between the attachment points over said first cross bars, (d) displacing said second array onto said first array by means of second cross bars lying parallel and in between the first cross bars, (e) laying a third array of strands over said first and second cross bars and between said attachment points, and (f) curing the structure.

Preferably the jig is separable from the energy absorbing structure after curing of the resin. Preferably the attachment points are retained in the energy absorbing structure so as to serve as attachment points for fixing the energy absorbing structure to, say, the interior of a vehicle door.

The lattice structure is advantageously relatively thin so that in, for example, an automobile it can be positioned between the outer skin of the door and the window winding mechanism.

Suitable materials for the manufacture of the structure described above are glass fibre or textile, roving or strands wetted with organic or chemical glues, paints, plastic materials, polythene, epoxy, urethanes, water glass mixed with cement, magnesium oxychloride, polyester resins and other kinds of plastics.

The invention also includes energy absorbing structures whenever fabricated by a method as hereinbefore described and further includes a vehicle door whenever reinforced by an energy absorbing structure fabricated by a method hereinbefore described.

The invention will now be described by way of example only with reference to FIGS. 1 to 3 of the accompanying drawings.

Figure 2A:
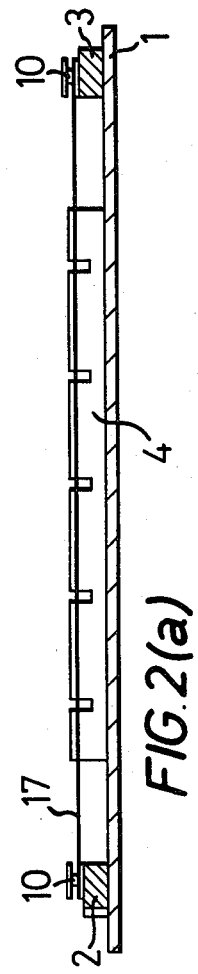

FIG. 1 shows an exploded view of a jig suitable for winding energy absorbing structures, and FIGS. 2(a), (b) and (c) shows three stages in the winding process for fabricating the structures on the jig.

The jig comprises a rectangular wooden base plate 1 having mounted upon it four detachable blocks, 2, 3, 4, 5 which are positioned near the edges of the plate 1. Each of the two end blocks 2, 3 are fixed to the base plate 1 by means of four nuts and bolts 6, 7 which also carry two washers 8, 9 separated by a spacer 10. Each of the two side blocks 4, 5 are fixed to the base plate 1 and carry five slots 11 along the length of the block, the slots being parallel to the ends of the base plate 1. The slots 11 are engageable as pairs by five wooden cross bars 12 which are dimensioned to lie flush with the upper surfaces of blocks 4, 5. The cross bars 12 may be locked into slots 11 by means of covering blocks 13, 14 which lie over side blocks 4, 5 and are fixed together by means of nuts and bolts 15, 16 passing through the base plate, side blocks and covering blocks.

In use of the jig, base plate 1 is assembled with end and side blocks 2, 3, 4 and 5. The side blocks 4, 5 are held with nuts and bolts 15, 16 and end blocks 2, 3 are held with nuts, bolts, 6, 7 and washers 8, 9 separated by spacers 10.

Continuous resin wetted fibre was produced by passing four continuous bundles of glass fibres together through a bath of polyester resin and then through an orifice plate to give a roughly uniform fibre diameter (not shown). The glass fibre rovings used were Vetrotex (EC 14, 2400 Tex) produced by St. Gobain Industries and each bundle contained about 208 fibres of about 10 micron diameter. The polyester resin used was Cellobond A 2785 CV (BP Chemicals Limited) with a catalyst and accelerator. The formulations were chosen so that easy wetting of the fibre occurred but with sufficient wetting to reduce run off tendency.

Figure 2B:
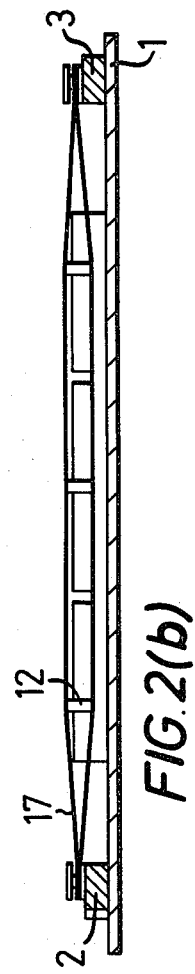
Figure 2C:
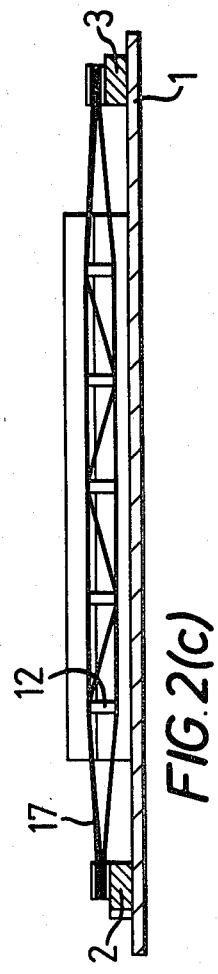

The stages of winding an energy absorbing structure as shown in FIG. 2 are as follows. In stage 1, the continuous resin wetted fibre 17 is wound round a spacer 10 on the end block 2 of the jig and is then passed to the corresponding spacer on the opposite end block 3. The winding is repeated as many times as necessary to yield a desired or pre-determined fibre strand diameter. Also selected areas may be wound with more or less fibres to achieve regions of different strength. The fibre 17 is then passed to an adjacent spacer 10 and then winding process repeated between this spacer and its corresponding spacer on the opposite end block until the desired or pre-determined fibre strand diameter is attained. This winding process is repeated until four longitudinal fibre strands link the opposite pairs of spacers 10 on the end blocks 2, 3. (The continuous resin wetted fibre is wound round adjacent spacers on the same end block to the same thickness as the longitudinal strands.)

In stage 2 of the process, three of the five wooden cross bars 12 are engaged in alternate slots and locked by covering blocks 13, 14 thereby pressing down and tensioning the four longitudinal resin strands (which are still wet and workable). The winding process of stage 1 is then repeated between the spacers 10 of the end blocks 2, 3 to form a similar array of four longitudinal resin wetted strands lying on top of the three cross bars 12 which separates them from the first array of longitudinal strands. A vertical cross section of this stage 2 is shown in FIG. 2 (b).

In stage 3 of the process, the covering blocks 13, 14 are removed and the remaining two of the five wooden cross bars 12 are engaged in the two vacant slots thereby pressing down the second array of longitudinal resin wetted strands onto the first array of strands. A third array of wetted strands are then laid down using the winding process of stage 1 over the top of the five cross bars 12 which are all now located in slots 11.

Subsequent to stages 1 to 3, the resin wetted strand is then allowed to cure. The cured energy absorbing structure is then removed from the jig by releasing all the nuts and bolts. A mould release agent may be used if necessary. The washers 8, 9 and spacers 10 are retained in the structure and serve as attachment points for, say, bolting the structure onto another structure such as the inside of an automobile door.

Figure 3:
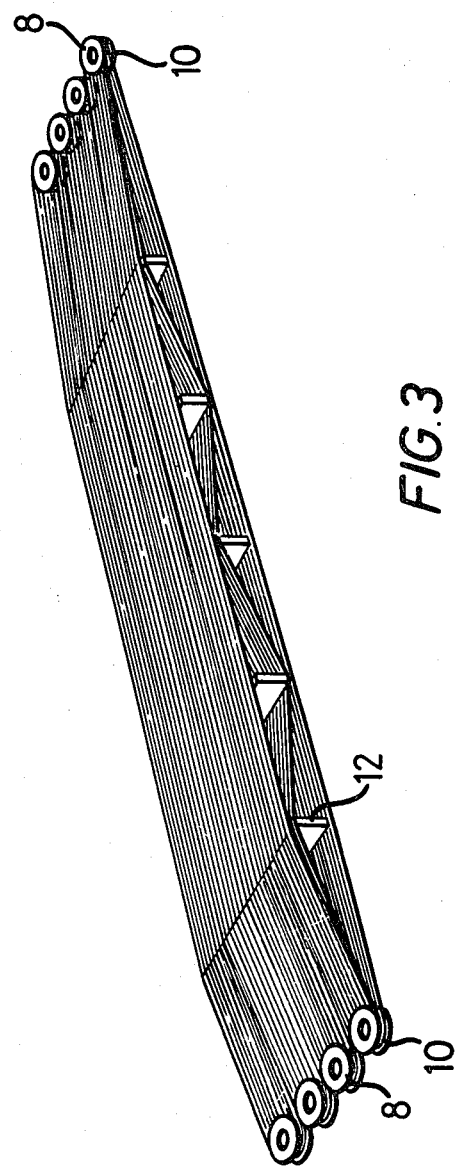

FIG. 3 illustrates a perspective view of the cured energy absorbent structure.

I claim:

1. A method of fabricating an energy absorbing structure comprising the steps of (a) winding a continuous resin wetted filament one or more times around an attachment point at one end of a jig to a further attachment point at the opposite end of the jig so as to form a longitudinal strand of pre-determined diameter, (b) passing the filament around and adjacent attachment point and repeating the winding sequence for further pairs of attachment points at opposite ends of the jig so as to build up an array of parallel strands, (c) displacing and tensioning the parallel strands by means of first cross bars substantially at right angles to the strands, (d) winding a second array of parallel strands between the attachment points at opposite ends of the jig over said first cross bars, (e) displacing said second array onto said first array by means of second cross bars lying parallel and inbetween the first cross bars, (f) laying a third array of parallel strands between the attachment points at opposite ends of the jig over said first and second cross bars and (g) curing the structure.

2. A method according to claim 1 in which the jig is removed from the structure after curing of the resin.

3. A method according to claim 1 or claim 2 in which the attachments are retained in the structure.

4. A method according to any of claims 1 to 3 in which the filament comprises glass fibre, carbon fibre, or textile fibre.

5. A method according to claim 1 in which the resin is an organic resin.

6. A method according to claim 5 in which the organic resin is a polyester resin or an epoxy resin.

7. A method according to claim 1 in which the resin is an inorganic resin.

8. A method according to claim 1 in which the continuous wetted filament is passed repeatedly between certain of the attachment points a greater number of times than the rest of the attachment points so as to build up a strand of greater cross section and therefore greater strength.

9. A method according to claim 1 or 8 in which the attachment points are spacers.

10. A method according to claim 1, or claim 8 in which the attachments are cylindrical spacers spaced apart a pair of discs or washers.

* * * * *

UNITED STATES PATENT AND TRADEMARK OFFICE
CERTIFICATE OF CORRECTION

PATENT NO. : 4,376,669
DATED : March 15, 1983
INVENTOR(S) : Friedrich C. Math

It is certified that error appears in the above—identified patent and that said Letters Patent is hereby corrected as shown below:

Claim 1, line 20, delete "and" and insert --an--.

Signed and Sealed this

Twenty-eighth Day of June 1983

[SEAL]

Attest:

GERALD J. MOSSINGHOFF

Attesting Officer     Commissioner of Patents and Trademarks